Patented July 21, 1942

2,290,833

UNITED STATES PATENT OFFICE 2,290,833

LAMINATED WOOD PRODUCT

Paul V. Keyser, Jr., New York, and Wallace Eells Spelshouse, Hollis, N. Y., assignors to Socony-Vacuum Oil Company, Incorporated, New York, N. Y., a corporation of New York No Drawing. Application May 22, 1940, Serial No. 336,596

6 Claims. (Cl. 106—230)

This invention relates to adhesive compounds suitable for use in the lamination of multi-ply products, and particularly designed for use in the lamination of thin wood sheets for the production of plywood.

Plywood, in the usual instance, is made by pressing together, with or without heating, thin sheets of Douglas Fir or similar wood to make built-up panels of several thicknesses. The final characteristics of the product depend to a large degree upon the nature of the adhesive product used, since this directly contributes to the mechanical strength, resistance to water, and resistance to warping, blistering, and separation of plies. The more usual adhesive is probably a casein base glue, the sheets being laminated at ordinary temperatures under a pressure of about 150# per square inch. Since these laminants are not sufficiently resistant to water for extensive or severe exposure, special grades for severe uses are usually produced by using synthetic resins, frequently of the Bakelite type, as adhesives, and resorting to hot pressing. These adhesives are more expensive.

The present invention has for its object the provision of adhesives which are waterproof, readily handled, and readily available from widespread and low-cost sources. It has as a particular object the provision of adhesives derived from low cost asphalt base compositions.

Various grades of straight asphalt have been proposed for this purpose, but have generally been found to be unsatisfactory, since the softer grades do not give a sufficiently strong bond between the plies, and the harder grades, including the oxidized asphalts and natural products of a similar nature, are too brittle, especially at lower temperatures.

This invention is based upon the discovery that by compounding, with properly selected asphaltic stocks, a resinous material and a microcrystalline wax material, there may be provided adhesives having high bonding strength, high resistance to moisture, and excellent uniformity of bonding strength over a wide range of temperature.

The asphaltic base of the proposed mixtures is an oxidized asphalt, preferably of a rather high melting point of from 225–300° F., derived from mineral oil. These products usually arise as a residue from the distillation of crude oil, which is then further treated by blowing with air while at a high temperature. Such products are well known and are readily available in quantity.

The resin additive should be a resinous material capable of being dissolved in the asphalt. Those most adaptable appear to be polymerized hydrocarbons derived from petroleum and coal tar, wood resin and similar products. For example high concentrated resinous products derived from the "polymers" produced in the "Gray" vapor phase treating process used in the oil industry, similar residues from petroleum such as "stfil base residue," the coal tar resins such as those appearing upon the market under the trade name "Cumar", supplied by the Barrett Company, or those sold under the trade name "Nuba" resins, supplied by the Neville Company, and gum rosin appear to be quite acceptable.

The "Cumar" and "Nuba" resins are those prepared from coke oven distillates containing the reactive aromatic hydrocarbons, coumarone and indene, by processes of controlled thermal or catalytic polymerization. They are essentially hydrocarbons, not saponifiable, unaffected by moderate concentrations of acids, alkalis, or salts. Their unsaturation is relatively low, with iodine numbers ranging from about 45 for high melting point products to about 100 for soft grades. They are quite soluble in aromatic hydrocarbons and in most of the better grade petroleum fractions used as resin diluents. They are permanently thermoplastic, and of relatively good heat stability.

The term micro-crystalline wax covers various grades of waxes of a certain kind derived from waxy residual petroleum oils. Those waxes are sometimes designated, very loosely, as petroleum waxes, or amorphous waxes, and are produced by treating oils of the nature of crude petroleum with chilling and centrifuging in the presence of solvents. They are substantially oil-free waxes of very small crystal form and are produced in various grades according to melting point, of which those grades beginning with the one commercially designated as 130° F. melting point petrolatum and harder are suitable for the present purpose. Even in the harder grades, such as 160° F. melting point petrolatum wax, the grain size is such that they are capable of lending a very desirable flexibility at lower temperatures to the asphalt mixture.

The most desirable adhesive mixtures for present purposes may be arrived at by compounding together an oxidized asphalt of from 225–300° F. melting point, (ring and ball method), from 5% to 25% by weight of the microcrystalline wax, and from 10% to 35% by weight of resin. For less exacting service, with asphalts at the lower end of the melting point range, a less desirable adhesive may be made by compounding together only the asphalt and resin, although mixtures so made with high melting point asphalts are quite useful.

In the following described tests, the test in all cases was made in the manner usual in the plywood industry by subjecting to tensile strength test an hourglass-shaped sample of laminated wood having a "neck" ½ inch wide and ½ inch long, saw-cut through one ply from one side, and through the remaining plies from the other side, the cuts being ½ inch apart, so that the pull is concentrated upon one layer of laminant in an area comprising ¼ of one square inch. Samples of commercial plywood so tested show tensile strengths ranging from 136 pounds per square inch to 200 pounds per square inch.

TABLE I

*Tests on asphalts alone*

| Adhesive | Tensile strength |
|---|---|
| | Lbs./sq. in. |
| 180/200 M. P. oxidized asphalt<br>Melting point R & B 192.5° F.<br>Pen. 77° F., 100 g, 5 sec. 21<br>Pen. 32° F., 200 g., 60 sec. 14 | 72 |
| 220/235 M. P. oxidized asphalt<br>Melting point (R & B) 230° F.<br>Pen. 77° F., 100 g., 5 sec. 15<br>Pen. 32° F., 200 g., 60 sec. 10 | 120 |
| 285/300 M. P. oxidized asphalt<br>Melting point R & B 299° F.<br>Pen. 77° F., 100 g., 5 sec. 2 | 132 |

TABLE II

*Tests on mixtures*

| | Adhesive composition | Tensile strength |
|---|---|---|
| | | Lbs./sq. in. |
| I | 80% (by wt.) 235/250 M. P. oxidized asphalt<br>20% (by wt.) "Nuba" Resin #2<br>Melting point R & B 224° F.<br>Penetrations:<br>  115° F., 50 g., 5 sec. 13<br>  77° F., 100 g., 5 sec. 5<br>  32° F., 200 g., 60 sec. 3 | 188 |
| II | 85% (by wt.) 220/235 M. P. oxidized asphalt<br>15% (by wt.) 212 M. P. still base residue<br>Melting point (R & B) 218° F.<br>Pen. 77° F., 100 g., 5 sec. 11 | 144 |
| III | 77% (by wt.) 285/300 M. P. oxidized asphalt<br>10% (by wt.) 130° M. P. petrolatum wax<br>13% (by wt.) FF wood rosin<br>Melting point (R & B) 220° F.<br>Penetrations:<br>  115° F., 50 g., 5 sec. 25<br>  77° F., 100 g., 5 sec. 11<br>  32° F., 200 g., 60 sec. 6 | 180 |

In each table the physical properties of the adhesive used is noted.

It will be noted from this table that the adhesives described are quite competent, the most desirable one from all standpoints being the one characterizing the mixtures of asphalt, resin, and micro-crystalline wax, which, as shown by penetrations, is characterized by a very much lower brittleness at lower temperatures than the adhesive of equal strength which is wax-free. It will also be noted that the wax-free composition of low melting point asphalt and resin, while of commercial strength, is at the lower end of the range of commercial strength and for many purposes would not be highly regarded.

We claim:

1. An adhesive composition for use in the laminating of wood plies and the like comprising an oxidized petroleum asphalt of a melting point of at least about 225° F., from about 5% to about 25% of a micro-crystalline petroleum wax, and from about 10% to about 35% of a resinous material compatible therewith.

2. An adhesive composition for use in the laminating of wood plies and the like comprising an oxidized asphalt of a melting point of at least about 225° F., and from about 10% to about 35% of a material selected from the group consisting of wood rosin and hydrocarbon resins derived from petroleum and coal tar.

3. An adhesive composition for use in the laminating of wood plies and the like comprising an oxidized petroleum asphalt of a melting point of at least about 225° F., from about 5% to about 25% of a micro-crystalline petroleum wax, and from about 10% to about 35% of a material selected from the group consisting of wood rosin and hydrocarbon resins derived from petroleum and coal tar.

4. An adhesive composition for use in the lamination of wood plies and the like consisting of from about 5 to about 25% by weight of a micro-crystalline petroleum wax, from about 10 to about 35% by weight of a material selected from the group consisting of wood rosin and hydrocarbon resins derived from petroleum and coal tar, the remainder being an oxidized petroleum asphalt of at least about 225° F. melting point.

5. A new article of manufacture comprising thin sheets of wood laminated together with an adhesive comprising an oxidized asphalt of at least about 225° F. melting point, and from about 10% to about 35% of a material selected from the group consisting of wood rosin and hydrocarbon resins derived from petroleum and coal tar.

6. A new article of manufacture comprising thin sheets of wood laminated together with an adhesive comprising an oxidized petroleum asphalt of a melting point at least about 225° F., from about 5 to about 25% by weight of a micro-crystalline petroleum wax, and from about 10 to about 35% by weight of a material selected from the group consisting of wood rosin and hydrocarbon resins derived from petroleum and coal tar.

PAUL V. KEYSER, JR.
WALLACE EELLS SPELSHOUSE.

CERTIFICATE OF CORRECTION.

Patent No. 2,290,833.                                           July 21, 1942.

PAUL V. KEYSER, JR., ET AL.

It is hereby certified that error appears in the printed specification of the above numbered patent requiring correction as follows: Page 1, second column, line 34, for "petroleum" read --petrolatum--; and that the said Letters Patent should be read with this correction therein that the same may conform to the record of the case in the Patent Office.

Signed and sealed this 22nd day of September, A. D. 1942.

(Seal)

Henry Van Arsdale,
Acting Commissioner of Patents.